United States Patent [19]

Swope

[11] Patent Number: 4,932,454
[45] Date of Patent: Jun. 12, 1990

[54] WINDOW INSERT

[76] Inventor: Thomas A. Swope, 1170 Ottawa Beach Rd., Apt. 15, Holland, Mich. 49423

[21] Appl. No.: 236,543

[22] Filed: Aug. 25, 1988

[51] Int. Cl.$^5$ .............................................. E06B 3/32
[52] U.S. Cl. .................................. 160/105; 160/116; 160/180
[58] Field of Search ............... 160/105, 116, 180, 327, 160/328, 368.1; 296/148, 152

[56] References Cited

U.S. PATENT DOCUMENTS

| | | | |
|---|---|---|---|
| 1,535,045 | 4/1925 | Scheidecker | 160/180 |
| 1,545,224 | 7/1925 | Whealdon | 160/105 X |
| 1,670,966 | 5/1928 | Hires | 160/327 |
| 1,684,027 | 9/1928 | Hinman | 160/116 X |
| 1,692,457 | 11/1928 | Magid | 160/105 |
| 1,702,395 | 2/1929 | Anderson | 160/105 |
| 2,549,234 | 4/1951 | Puffer | 160/105 X |
| 2,625,217 | 1/1953 | Spiller et al. | 160/354 X |
| 2,708,927 | 5/1955 | Dixon et al. | 160/180 X |
| 2,774,116 | 12/1956 | Wolverton | 160/116 X |
| 3,251,399 | 5/1966 | Grossman | 160/180 |
| 3,587,706 | 6/1971 | Widmer | 160/105 |
| 4,316,345 | 2/1982 | Rivette et al. | 160/180 X |
| 4,355,678 | 10/1982 | Romano | 160/327 X |
| 4,463,790 | 8/1984 | Clapsaddle | 160/105 |

FOREIGN PATENT DOCUMENTS 961299  4/1957  Fed. Rep. of Germany ...... 160/180

Primary Examiner—Blair M. Johnson
Attorney, Agent, or Firm—Price, Heneveld, Cooper, DeWitt & Litton

[57] ABSTRACT

A window insert comprising a transparent panel which is slightly resiliently flexible whereby it can be flexed sufficiently to facilitate insertion into a window opening. The flexible, transparent panel includes an aperture having an area at least great enough to comfortably fit a hand therethrough. A flexible, transparent cover is mounted on the panel so as to hang over the aperture whereby a person can pass his or her hand through the aperture by pushing aside the transparent cover.

12 Claims, 1 Drawing Sheet

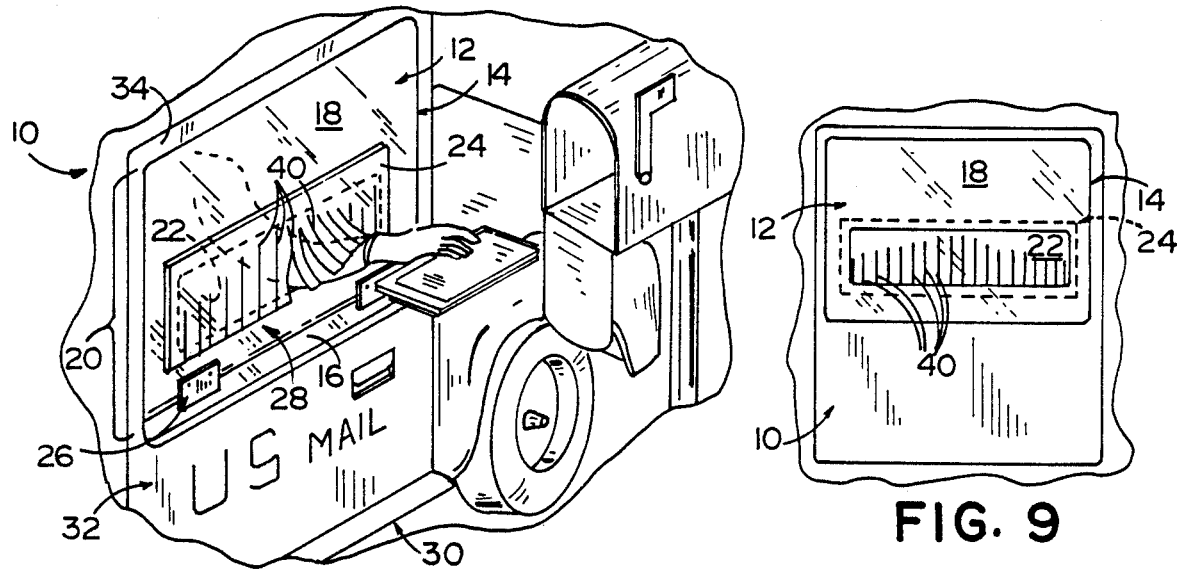
FIG. 1
FIG. 9
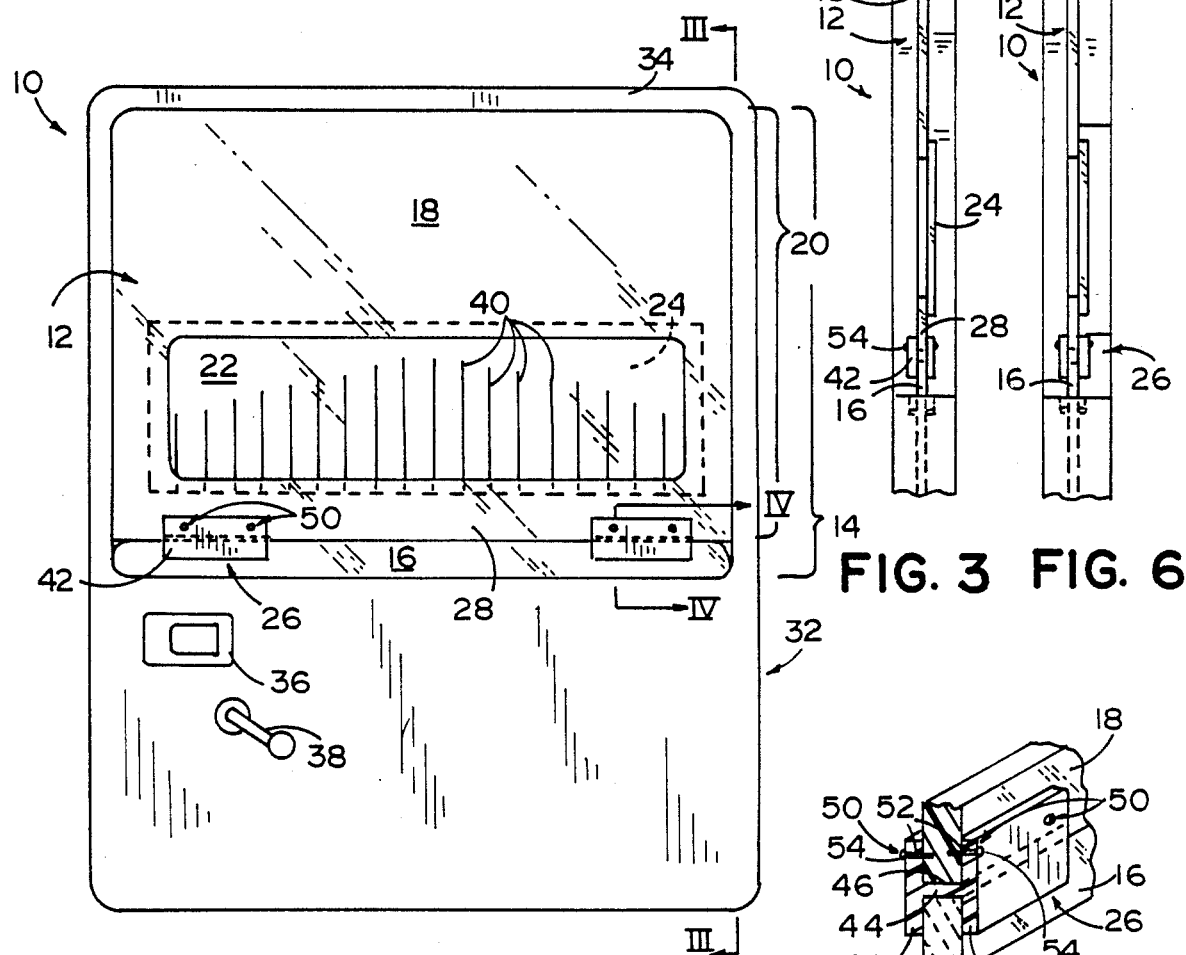
FIG. 2
FIG. 3  FIG. 6
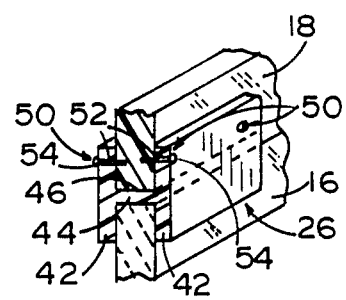
FIG. 4

WINDOW INSERT

BACKGROUND OF THE INVENTION

The present invention relates to windows for vehicles, buildings and the like, and in particular to an improved insert therefor.

Vehicles and buildings include windows that can often be readily opened and closed. With the service industry, such as the U.S. Mail Service, "fast-food" restaurants, banks and the like, it is not uncommon to deliver items via the window. For example, a postal person may deliver the bulk of his or her mail for a given dry through use of a vehicle window.

Conventional windows for vehicles and fast-food restaurants, to name just a few, present a problem for the user on either a hot or cold day. Each time the postal person is required to make a delivery, it is necessary to open and close the window. Such opening and closing results in extensive heat exchange between an interior of the vehicle and the surrounding environment, so that on cold days additional heat must be supplied to the vehicle and on hot days additional heat must be removed. During the Summer and Winter seasons, the mere opening and closing of the window can result in a considerable amount of heat loss or heat gain from the vehicle interior.

SUMMARY OF THE INVENTION

The window insert of the present invention comprises a transparent panel which is slightly resiliently flexible whereby it can be flexed sufficiently to facilitate insertion into a window opening. The flexible, transparent panel includes an aperture having an area at least great enough to comfortably fit a hand therethrough. A flexible, transparent cover is mounted on the panel so as to hang over the aperture whereby a person can pass his or her hand through the aperture by pushing aside the transparent cover.

BRIEF DESCRIPTION OF THE DRAWINGS

FIG. 1 a fragmentary perspective view of a window insert, embodying the present invention, installed in a vehicle window;

FIG. 2 is an elevational view of the installed window insert viewed from an interior portion of the vehicle;

FIG. 3 is a cross-sectional view of the installed window insert;

FIG. 4 a fragmentary cross-sectional view of an engaging employed to engage the window insert to an upper edge of a movable window;

FIG. 5 is a fragmentary perspective view of the window insert secured to the window edge;

FIG. 6 is a fragmentary side cross-sectional view of the window including a shield mounted therein;

FIG. 7 is a fragmentary perspective view of the window insert the shield mounted thereon;

FIG. 8 is a fragmentary cross-sectional view of the window with the shield mounted thereon taken along lines VIII—VIII of FIG. 7; and FIG. 9 is an elevational view of the window insert installed in a building opening.

DETAILED DESCRIPTION OF THE PREFERRED EMBODIMENTS

For purposes of description herein, the terms "upper", "lower", "right", "left", "rear", "front", "vertical", "horizontal" and derivatives thereof shall relate to the invention as oriented in FIG. 1. However, it is to be understood that the invention may assume various alternative orientations and step sequences, except where expressly specified to the contrary. It is also to be understood that the specific devices and procedures illustrated in the attached drawings, and described in the following specification, are simply exemplary embodiments of the inventive concepts defined in the appended claims. Hence, specific dimensions, and other physical characteristics relating to the embodiments disclosed herein are not to be considered as limiting, unless the claims by their language expressly state otherwise.

Referring to FIG. 1, there is shown a window insert 10 for a window 12 of the type including an opening 14 and movable window 16. Window insert 10 comprises a transparent panel 18 which is inserted into a window opening 20 formed by moving the movable window 16 substantially out of the opening 14. Disposed within the panel 18 is an aperture 22 having an area at least great enough to comfortably insert a hand therethrough. A flexible transparent cover 24 is mounted on the panel 18 so as to hang over aperture 22. Engagement assemblies 26 are operatively connected to an edge 28 of panel 18 for engaging the movable window 16 when it is moved toward panel 18 located in window opening 20.

In the preferred embodiment, window insert 10 (FIG. 1) is employed in a delivery vehicle, such as a postal delivery truck. Nevertheless, in the broader aspects of the invention, window insert 10 would serve equally well in other contexts in which delivery through a window is required, such as in a bank (FIG. 9) or a "fast-food" restaurant. Window insert 10 may be temporarily installed, as in a vehicle (FIG. 1), for convenient removal when not in use, or permanently installed, as in a building (FIG. 9).

In the present embodiment, vehicle window 12 is on the driver's side, and includes opening 14 receiving movable window 16. As illustrated in FIG. 2, an interior view of a vehicle door 32, opening 14 is disposed within a frame 34. As with vehicles in general, door 32 includes a door latch 36 and window crank 38 which are employed in a conventional manner. As is also conventional with vehicles 30, movable window 16 seats within a groove or track 64 (FIG. 3) in frame 34. Movable window 16 can assume various selected positions ranging from an "open" position in which movable window 16 is stored within a lower portion of door 32, out of opening 14, to a "closed" position, in which movable window 16 is completely contained within opening 14.

Panel 18, as illustrated in FIG. 2, is sized to substantially fill opening 14. In the preferred embodiment, panel 18 is transparent, and constructed from plastic materials so that it is durable, and holds up well against the elements, such as heat, cold, rain and snow. When employed in vehicle 30, panel 18 has a height dimension which is slightly less than that of opening 14 so that a top edge of movable window 16 can be engaged with panel edge 28.

Panel 18 is constructed of slightly resiliently flexible material which can be sufficiently flexed to facilitate insertion of panel 18 into opening 14 when movable window 16 is in the open position. Panel 18 should possess enough rigidity to maintain a substantially vertical orientation (FIG. 3) typically associated with a vehicle window. It can be flexed slightly to facilitate its insertion into channel or track 64 which extends along the inwardly facing edge of the sides and top of frame 34.

In the present example, panel 18 is just large enough to fill window opening 20 which is defined by moving movable window 16 substantially out of opening 14. By leaving a portion of movable window 16 within opening 14, a base upon which panel 18 may be mounted is provided. The dimensions of window opening 20 may be easily adjusted through employment of window crank 38.

Panel aperture 22 is an elongate opening disposed within a lower portion of panel 18. For ease of delivery, panel aperture 22 should at least have a great enough area to allow a hand with mail or packages to comfortably fit therethrough. In actual practice, since insert 10 is intended for a wide range of delivery uses, it is desirable to make the area of aperture 22 great enough to afford a medium-to-large-sized package.

To alleviate heat exchange between an interior portion of vehicle 32 and the environment surrounding the same, cover 24 is mounted on panel 18 so as to hang over and substantially cover panel aperture 22. Cover 24 is flexible so that a person can easily pass his or her hand through the panel aperture by simply pushing aside flexible cover 24. Furthermore, flexible cover 24 is transparent so that the person using insert 10 can view an area or receptacle to which one or more items may be delivered. In the preferred embodiment, three edges of flexible transparent cover 24 are conventionally mounted on panel 18, as illustrated in FIG. 2.

A plurality of vertically oriented slits 40 are disposed within cover 24 to selectively circumscribe access to aperture 22 as the hand is passed therethrough. As best illustrated in FIG. 5, each of slits 40 is perpendicular to a bottom edge of flexible cover 24 and extend from a front surface of cover 24 to a rearward surface of the same. By providing slits 40 it is possible to pass the hand through flexible cover 24 while only raising a selected portion of the same.

Engaging brackets 26 are operatively connected to panel edge 28 for purposes of engaging panel 18 with a top edge of movable window 16. In the preferred embodiment, each engaging bracket 26 includes opposing support plates 42 (FIGS. 3, 4 and 6) connected by spacer strip 44 to define upper channel 46 and lower channel 48. As best seen in FIG. 5, panel 18 is preferably notched to receive strip 44 so that panel 18 seats snugly atop window 16 with little or no gap between the two. Support plates 42 are spaced just far enough apart so that panel edge 28 is snugly received by upper channel 46 and the upper edge of movable window 16 is snugly received by lower channel 48. As best illustrated in FIG. 4, engaging bracket 26, which has an "H" cross section, includes securement means 50 which are employed to engage brackets 26 against panel edge 28. In the present example, securement means 50 comprise apertures 52 which receive securement pins 54. Alternatively, rivets, or other suitable securement means could be employed.

As the vehicle is driven down the road at higher speeds, flexible cover 24 may be lifted by wind currents passing by cover 24. This would result in an inordinate amount of either heat loss or heat gain. To remedy this problem, wind deflector shield or baffle 56 is mounted on panel 18 directly in front of a leading edge 58 of flexible cover 24. In the present example, deflection shield 56 includes a base strip 60, which, as illustrated in FIG. 7, is secured to panel 18, and a deflection strip 62, which is integrally connected to base strip 60. Deflection strip 62 is angled with respect to base strip 60 so that wind currents approaching leading edge 58 of flexible cover 24 are channeled away from the front surface of cover 24.

To install insert 10 in vehicle door 32, movable window 16 is initially set in an open position and panel 18 is flexed sufficiently for insertion into opening 14. Movable window 16 is moved upward using window crank 38 until the upper edge of movable window 16 is secured within lower channels 48 (FIGS. 3 and 6) and window insert 10 is held in a substantially upright position, being rigidly held between upper channels 46 of brackets 26 and upper door frame track or channel 64.

Due to its construction, window insert 10 aids in preventing heat escape on cool days and facilitates cooling on hot days. By including slits 40 in flexible cover 24, it is possible to selectively circumscribe access to panel aperture 22. When used in a vehicle, insert 10 is conveniently and effectively secured to movable window 16 through use of engagement assemblies 26. Insert 10 is easy to manufacture and use, and is therefore particularly effective for its intended purpose.

In the foregoing description, it will readily be appreciated by those skilled in the art that modifications may be made to the invention without departing from the concepts disclosed herein. Such modifications are to be considered as included in the following claims unless the claims by their language expressly state otherwise.

The embodiments of the invention in which an exclusive property or privilege is claimed are defined as follows:

1. A window insert for windows including an opening and a movable window which can be moved into or out of said opening, said window insert comprising:
   a transparent, one-piece panel which is slightly resiliently flexible whereby said panel can be flexed sufficiently to facilitate insertion into a window opening formed by moving the movable window out of the opening, said panel being substantially coplanar with said movable window upon insertion and further being solid and thereby limiting heat transfer therethrough;
   an aperture in said panel having an area at least great enough to comfortably insert a hand therethrough;
   a flexible transparent cover mounted on said panel so as to hang over said aperture whereby a person can pass his or her hand through said aperture by pushing aside said transparent cover, said flexible transparent cover having a plurality of vertically oriented slits disposed therein to selectively circumscribe access to said panel aperture when the hand is passed therethrough; and
   engaging means disposed on an edge of said panel which operatively engages the movable window when it is moved toward said panel located in the window opening.

2. The window insert of claim 1, wherein:
   said engaging means comprises a first channel opening away from said edge of said panel for receiving an edge of the movable window such that said window insert is aligned in the same plane as the movable window.

3. The window insert of claim 2, further comprising:
   a second channel receiving said edge of said panel.

4. The window insert of claim 3, wherein:
   said engaging means includes means for securing same to the edge of said insert.

5. The window insert of claim 1, further comprising:
means secured to said panel for deflecting wind from a front surface of said cover such that the amount of air currents circulating through said panel aperture is alleviated.

6. The window insert of claim 5, wherein:
said deflecting means includes a transparent, elongate strip operatively connected to said panel in a substantially vertical position;
said strip being positioned in front of said panel aperture and angled with respect to a surface of said panel such that wind is deflected away from said panel aperture and yet allowed to pass around said insert.

7. A window insert for windows including an opening and a movable window which can be moved into or out of the opening, said window insert comprising:
a transparent, one-piece, air impervious panel which can be inserted into a window opening said panel being substantially coplanar with said movable window upon insertion formed by moving the movable window out of the opening;
an aperture in said panel having an area at least great enough to comfortably insert a hand therethrough;
a flexible transparent cover mounted on said panel so as to hang over said panel aperture whereby a person can pass his or her hand through said aperture by pushing aside said transparent cover, said flexible transparent cover having a plurality of vertically oriented slits disposed therein to selectively circumscribe access to said panel aperture when the hand is passed therethrough;
engaging means on an edge of said panel which engages the movable window when it is moved toward said panel located in the window opening.

8. The window insert of claim 7, wherein:
said engaging means comprises a first channel opening away from said edge of said panel for receiving an edge of the movable window such that said window insert is aligned in the same plane as the movable window.

9. The window insert of claim 8, further comprising:
a second channel receiving said edge of said panel.

10. The window insert of claim 9, wherein:
said engaging means includes means for securing same to the edge of said insert positioned within the second channel.

11. The window insert of claim 7, further comprising:
means secured to said panel for deflecting wind from a front surface of said cover such that the amount of air currents circulating through said panel aperture is alleviated.

12. The window insert of claim 11, wherein:
said deflecting means includes a transparent, elongate strip operatively connected to said panel in a substantially vertical position;
said strip being positioned in front of said panel aperture and angled with respect to a surface of said panel such that wind is deflected away from said panel aperture and yet allowed to pass around said insert.

* * * * *

UNITED STATES PATENT AND TRADEMARK OFFICE
CERTIFICATE OF CORRECTION

PATENT NO. : 4,932,454

DATED : June 12, 1990

INVENTOR(S) : Thomas A. Swope

It is certified that error appears in the above-identified patent and that said Letters Patent is hereby corrected as shown below:

```
Column 1, line 14:
  "dry" should be --day--;

Column 1, line 55:
  After "window" insert --insert--;

Column 1, line 55:
  "therein" should be --thereon--;

Column 1, line 57:
  After "insert" insert --with--;

Column 1, line 59:
  After "window" insert --insert--.
```

Signed and Sealed this

Seventh Day of January, 1992

Attest:

HARRY F. MANBECK, JR.

*Attesting Officer*    *Commissioner of Patents and Trademarks*